United States Patent
Willey

(10) Patent No.: US 8,938,264 B2
(45) Date of Patent: Jan. 20, 2015

(54) APPARATUS, AND ASSOCIATED METHOD, FOR FORMING A PAGE MESSAGE INCLUDING A STRUCTURE OF PARTIAL IDENTIFIERS OF DIFFERING BIT LENGTHS USING RANDOM OR PSEUDORANDOM NUMBERS

(75) Inventor: William Daniel Willey, Gilroy, CA (US)

(73) Assignee: BlackBerry Limited, Waterloo (CA)

( * ) Notice: Subject to any disclaimer, the term of this patent is extended or adjusted under 35 U.S.C. 154(b) by 1337 days.

(21) Appl. No.: 11/850,137

(22) Filed: Sep. 5, 2007

(65) Prior Publication Data

US 2008/0070600 A1    Mar. 20, 2008

Related U.S. Application Data

(60) Provisional application No. 60/824,561, filed on Sep. 5, 2006.

(51) Int. Cl.
*H04W 68/00* (2009.01)
*H04W 68/02* (2009.01)

(52) U.S. Cl.
CPC .................................. *H04W 68/025* (2013.01)
USPC ........ 455/458; 455/466; 455/412.2; 455/515; 455/500; 455/422.1; 455/445

(58) Field of Classification Search
None
See application file for complete search history.

(56) References Cited

U.S. PATENT DOCUMENTS

| | | | |
|---|---|---|---|
| 5,950,114 A | 9/1999 | Balachandran et al. | |
| 7,373,146 B2 * | 5/2008 | Kong et al. | 455/426.1 |
| 7,499,418 B2 * | 3/2009 | Oprescu-Surcobe et al. | 370/311 |
| 7,925,279 B2 * | 4/2011 | Willey | 455/458 |
| 2003/0076871 A1 | 4/2003 | Abrishamkar et al. | |
| 2003/0223427 A1 * | 12/2003 | Chang et al. | 370/395.3 |
| 2006/0019641 A1 * | 1/2006 | Vayanos et al. | 455/414.1 |
| 2007/0015523 A1 * | 1/2007 | Prakash et al. | 455/458 |
| 2007/0050851 A1 | 3/2007 | Musha et al. | |
| 2007/0074275 A1 | 3/2007 | Bajko et al. | |
| 2007/0254679 A1 * | 11/2007 | Montojo et al. | 455/458 |
| 2008/0081613 A1 * | 4/2008 | Yang et al. | 455/426.1 |

OTHER PUBLICATIONS

John Harris et al., "Quick Paging Optimization & Performance Analysis", 3rd Generation Partnership Project 2, 3GPP2-C21-20060911-016, Xi'an China, Sep. 11-15, 2006, pp. 1-10.*
John Harris, "Quick Paging Optimization—Falsing Reduction", 3rd Generation Partnership Project 2, 3GPP2-C22-20060825-003, Motorola, Aug. 25, 2006, pp. 1-7.
"UHDR-One: Connection Layer Design", 3GPP2-C20-20060626-018R1, Qualcomm, Jun. 26, 2006, pp. 1-35.
Rajat Prakash, "UHDR-One: MAC Layer Overhead Channels", 3GPP2-C20-20060731-033, Qualcomm, Jul. 31, 2006, pp. 1-16.
Session Seed May 24, 2006, www.wireless.aglient.com, 1 page.

* cited by examiner

*Primary Examiner* — Willie J Daniel, Jr.
(74) *Attorney, Agent, or Firm* — Fitch, Even, Tabin & Flannery LLP

(57) ABSTRACT

Apparatus, and an associated method for facilitating paging of an access terminal operable in a radio communication system. The access terminal is identified by part of a pseudorandom, or random, number, such as a session seed. The part of the number is included in the page message when the access terminal is to be paged. When included in the message, the access terminal detects the page and the part of the number contained therein that identifies the access terminal.

3 Claims, 2 Drawing Sheets

APPARATUS, AND ASSOCIATED METHOD, FOR FORMING A PAGE MESSAGE INCLUDING A STRUCTURE OF PARTIAL IDENTIFIERS OF DIFFERING BIT LENGTHS USING RANDOM OR PSEUDORANDOM NUMBERS

CROSS REFERENCE TO RELATED APPLICATIONS

The present invention claims the priority of provisional patent application No. 60/824,561, filed on Sep. 5, 2006, the contents of which are incorporated herein by reference.

The present invention relates generally to a manner by which to page an access terminal of a radio communication system to alert the access terminal of a pending call, or other communication. More particularly, the present invention relates to apparatus, and an associated method, by which to form a quick page message that includes a structure, formed of partial identities of access terminals that are paged. The bit length of one or more of the partial identities is shortened, and one or more others have a bit length that is lengthened in an attempt to create partial identities that are of redundant values. When two or more identities are of the same values, duplicate partial identities are removable from the page message, permitting the bits of the removed, partial identities to be allocated to, e.g., increase lengths of partial identities remaining in the structure of the page message.

When quick paging is performed through broadcast of a page message, for a given number of pages included in the page message, the structure of the page message includes partial identities of lengths best to minimize occurrence of false wakeup of an access terminal to which the message is broadcast. Excessive battery depletion as a result of false wakeup of the access terminal is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also providing the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard defines a quick paging channel (QPCH) upon which access-terminal pages are broadcast by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH.

In one configuration, the quick page message contains quick page indicators. The quick page message includes a number of quick page indicator slots populated with the quick page indicators that indicate whether an access terminal is being paged. An exemplary configuration of a scheme that utilizes page indications is set forth, for instance, in industry contribution 3GPP2 C20-20060731-033. In this configuration, during operation, a mobile station hashes to a quick page indicator location, i.e., slot, within the quick page message based upon a session seed, i.e., a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In another configuration, a partial hash comparison scheme is provided. In the disclosed partial hash comparison scheme, the access network forms a quick page message in which a portion of an access terminal identifier (ATI) of an access terminal that is paged is placed in the quick page message. An access terminal that monitors for the delivery of a quick page message, reads the content of the message and compares the values with corresponding values, that is, portions of a hash of the identifier of that access terminal. If the values do not match, then the access terminal enters into a reduced power state, e.g., a sleep state.

The QPCH message, as presently-proposed, provides thirty-five page indication locations, i.e., bits available to be populated with paging indicators. The aforementioned "partial hash comparison" scheme utilizes three of the thirty-five page indication locations for identifying the number of pages, and the remaining page indication locations are available for paging, viz., are available. While the proposed, partial hash comparison scheme reduces the false wakeup probability when paging load is relatively low, as the paging load increases, the reduction in the available page indication locations actually increases the possibility of false wakeup. When more than five access terminals are paged, partial hash comparison is not used due to this increased possibility. Instead, hashing to page indication locations is performed.

If a manner could be provided by which to improve the performance of a scheme that utilizes partial comparison pursuant to paging by better reducing the possibility of false wakeup, improved battery longevity of the access terminal would be possible.

It is in light of this background information related to paging by an access network of an access terminal that the significant improvements of the present invention have evolved.

DETAILED DESCRIPTION

Figure 1:
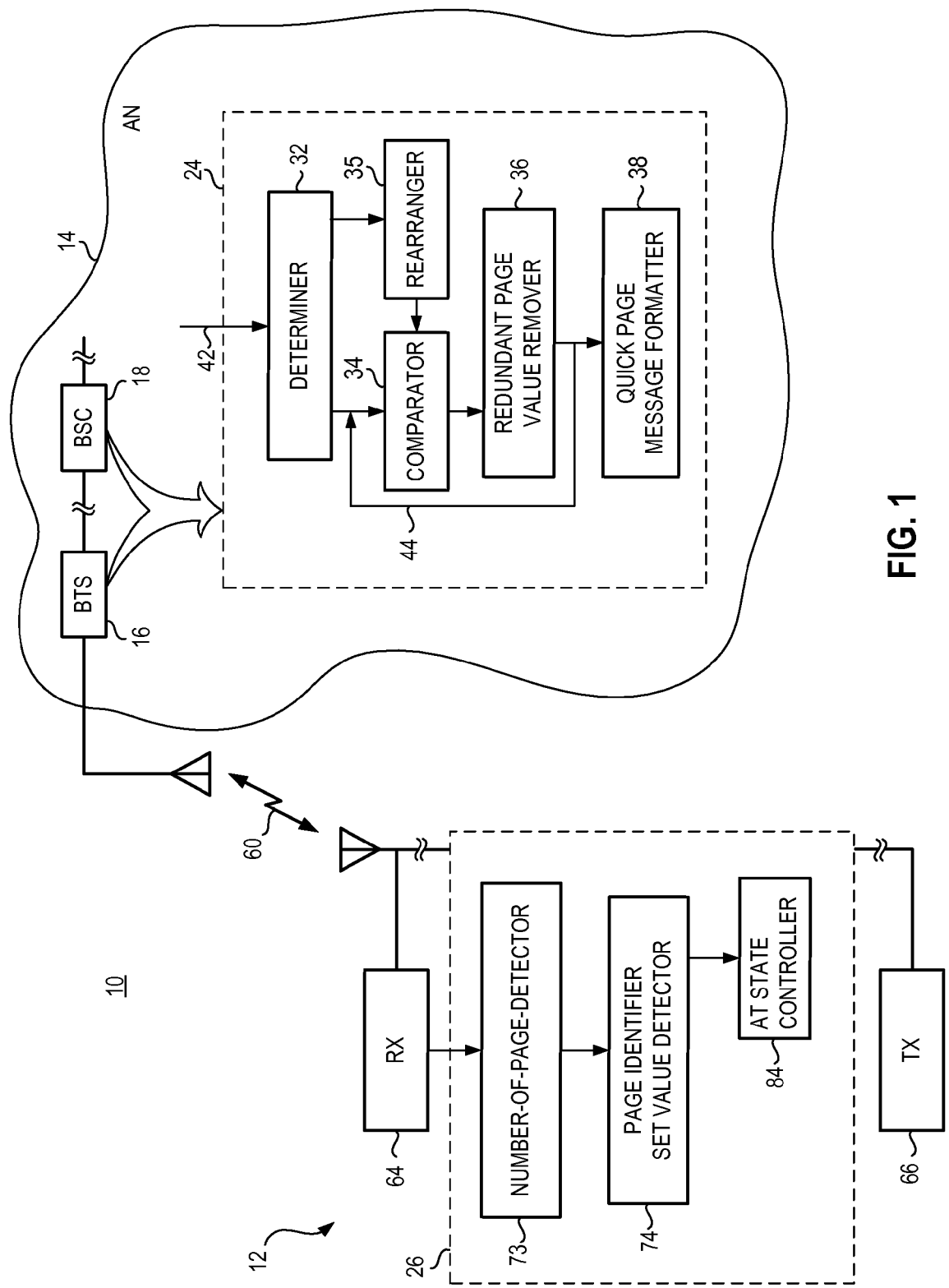
FIG. 1 illustrates a functional block diagram of a radio communication system in which an embodiment of the present invention is operable.

The present invention, accordingly, advantageously provides an apparatus, and an associated method, by which to page an access terminal of a radio communication system to alert the access terminal of a pending call, or other communication.

Through operation of an embodiment of the present invention, a manner is provided by which to form a quick page message that includes a structure formed of partial identities of access terminals that are paged. The partial identities are each of selected lengths, selected in manners that act to facilitate reduction in the possibility of false wakeup of an access terminal that monitors delivery of the quick page message.

In one aspect of the present invention, the bit length of one or more of the partial identities is shortened and one or more of the others of the partial identities is lengthened. The selection of the bit-length shortening and bit-length lengthening is made better to cause creation of partial identities of identical values, thereby to become redundant. By decreasing the bit length of a partial identity, the likelihood of its identity with another partial identity of the same length is increased. And, when redundant partial identities are formed, the redundancy is removed, permitting the bits of the redundant, partial identity to be allocated to lengthen other partial identities. Such increase facilitates reduction in the likelihood of a false wakeup at an access terminal that receives the quick page message.

In another aspect of the present invention, a partial identity scheme is utilized in the quick paging procedure. The partial identity comparison utilizes parts of the identifiers, such as access terminal identifiers (ATIs), pseudorandom or random numbers, or any other numbers amenable for association with access terminals that are paged. The portion of the identifier that is included in the quick page message comprises, for instance, a selected number of the most significant bits, or least significant bits, of the number. The length of each of the partial identifiers is selected and is dependent upon various factors.

The length of the quick page message is prescribed. For instance, the quick page message is of a thirty-five bit length of which thirty-two bits are available to be populated with a structure including a selected number of partial identifiers. The other three bits, e.g., identify the number of pages contained in the quick page message. In general, when the number of pages increases, the number of bits available in the quick page message available to identify a particular access terminal decreases due to the prescribed length of the quick page message. That is to say, for example, if thirty-two bits are available in the quick page message, and only one access terminal is paged, all thirty-two bits are allocable to identify the access terminal that is paged. However, if two access terminals are to be paged, the same thirty-two bits must be divided so that both of the access terminals can be paged. Analogously, when three access terminals are paged, the available thirty-two bits of the quick page message must be divided to permit all three of the access terminals to be paged, and so forth when there are greater numbers of access terminals that are paged.

In a conventional proposal, the available bits of the quick page message are divided equally to provide to each of the access terminals that are paged an equal number of bits in the quick page message when a partial comparison scheme is used. However, depending upon the number of pages, the thirty-two available bits cannot be divided equally. To maintain the equal distribution of the allocated bits, one or more of the thirty-two bits is unused.

Operation of an embodiment of the present invention both makes better utilization of all the available bits of the quick page message available to page access terminals and to select a structure including selection of lengths of partial identifiers of the access terminals that are to be paged. Selection of the bit lengths of the partial identifiers is made to increase the possibility of occurrence of redundant partial identifiers that permit the redundancies to be removed out of the quick page message and the bit locations of the removed, redundant values are then usable to increase the bit lengths of the partial identifiers of the remaining, e.g., non-redundant, partial identifiers.

By reducing the bit-length of a partial identifier, the possibility of the shortened, partial identifier being identical with another partial identifier of the same length increases. By creating such a redundancy, a redundant partial identifier is removable out of the quick page message, and the structure of the quick page message is changed to reallocate the newly-available bits to lengthen the partial identifiers of one or more other partial identifiers of the structure. Different numbers of partial bits are used dependent upon the number of partial bits of the partial identifiers of different access terminals that match.

In these and other aspects, therefore, an apparatus, and an associated method, is provided for an access network of a communication network that generates a first page message on a first paging channel. A determiner is configured to determine page values of each page identifier set of each page intended to be included in the first page message. A rearranger is configured to rearrange a length of at least one of the page identifier sets of pages intended to be included in the first page message. Rearrangement is made in a manner that facilitates reduction in a probability parameter.

In these and further aspects, a further apparatus, and an associated method, is provided for an access terminal that monitors a first paging channel for delivery of a first paging message. A number-of-pages detector is configured to detect how many page identifier sets are included in the first page message. A page identifier set value detector is configured to detect values of each page identifier set detected by the number-of-pages detector to be included in the first page message.

Lengths of the page identifier sets are arranged in a manner facilitating reduction of a probability parameter.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, access terminals are alerted, by broadcast of a page message when a communication, initiated at the network, is to be terminated at an access terminal. A quick paging channel (QPCH), or analogous channel, is defined. Information contained in a quick page message broadcast on the quick paging channel identifies access terminals that are paged. When an access terminal detects, from the quick page message, that the access terminal is paged, the access terminal further operates in anticipation of the page and subsequent communication. The access terminal, conversely, enters into a reduced-power consumption state, e.g., a sleep state if the access terminal is not being paged. If the access terminal incorrectly determines that it is being paged, the access terminal falsely wakes up. And, increased levels of power are consumed by the access terminal, resulting in reduced battery longevity. The aforementioned partial hash comparison scheme is intended to reduce the likelihood of false wakeup of the access terminal, but, as presently implemented, provides advantages only when a quick page message pages five or fewer access terminals. Additionally, not all of the bits of a quick page message are fully utilized in every paging scenario, and the existing scheme, for this reason, is less than ideal.

Accordingly, pursuant to an embodiment of the present invention, the access network includes apparatus 24, and the access terminal includes apparatus 26, that operate pursuant to quick page message generation and quick page message receipt in manners that reduce the likelihood of occurrence of false wakeup relative to an existing partial hash comparison scheme. The elements of the apparatus 24 and of the apparatus 26 are functionally represented, implementable in any desired manner, including, for instance, by algorithms executable by processing circuitry.

The elements forming the apparatus 24 are implemented at any appropriate location of the access network, including, as illustrated, at the BTS 16 or BSC 18, or distributed amongst such entities, as well as others.

Here, the apparatus 24 includes a determiner 32, a comparator 34, a rearranger 35, a redundant page value remover 36, and a quick page message formatter 38.

The determiner 32 operates to determine, based upon information provided thereto, here represented by way of the lines 42, information associated with a quick page message that is to be created for broadcast to access terminals. The information provided to the determiner includes, for instance, identifiers that identify the access terminals that are to be paged. The identifiers comprise multi-bit numbers, for instance, forming the access terminal identifiers (ATIs) of the access terminals, pseudorandom numbers, or random numbers, or any other values amenable for identification of an associated access terminal. The determiner, for instance, determines, based upon the number of pages intended to be included in the quick page message, to create partial identifiers of the respective identifiers of the access terminals. Determinations made by the determiner of the bit lengths of the partial identifiers are, for instance, conventionally-selected bit lengths. Indications of determinations made by the determiner are provided to the comparator 34 and to the rearranger 35. The comparator compares values of the partial identifiers intended to be included in the quick page message. Such comparisons indicate whether any of the partial identifiers are redundant. As a result of comparisons made by the comparator, the redundant page remover 36 removes the redundant partial identifiers. A loop back to the determiner, here represented by way of the path 44, permits reconfiguration of the partial identifiers subsequent to removal of a redundant partial identifier.

Here further, the rearranger 35 is operable. The rearranger is operable further to rearrange the bit lengths of the partial identifiers that are determined by the determiner to be includable in a quick page message intended to be broadcast.

In first exemplary operation of an embodiment of the present invention, the determinations made by the determiner are first provided to the rearranger, and the rearranger rearranges the bit lengths of one or more of the partial identifiers. A bit-length of at least one of the partial identifiers is reduced, permitting, if desired, lengthening of the bit length of one or more others of the partial identifiers. The rearrangement made by the rearranger, such as by shortening the bit length of a partial identifier increases the possibility that another partial identifier of corresponding length shall be of the same values and thereby redundant thereto. That is to say, therefore, the rearranger operates to form partial identifiers in manners to increase the possibility of formation of redundant partial identifiers. Redundant partial identifiers need not be included in a quick page message and are deletable by the redundant page remover 36. In this exemplary operation, determinations made by the determiner are provided to the rearranger. The rearrange rearranges the bit lengths of one or more partial identifiers. Once rearranged, the partial identifiers are compared by the comparator, and redundancies are removed by the redundant page remover 36.

In alternate operation, rearrangement is performed by the rearranger subsequent to a first pass of determined values determined by the determiner and compared by the comparator. Or, if desired, operation need not include operation of the rearranger although, generally, the advantages provided by the rearranger in increasing the likelihood of formation of redundant, partial identifiers is not then provided.

Upon completion of rearrangement, comparison, redundant page removal, and reallocation, if elected, of the available bits, indications are provided to the quick page message formatter 38. The quick page message formatter 38 formats a quick page message to include the partial identifiers that shall be included in the quick page message, subsequently to be broadcast by the access network.

Through removal of redundant, partial identifiers, better use is made of the limited bit-length of the quick page message. And, through operation of the rearranger, the likelihood of a redundancy of a partial identifier, permitting its removal, is increased. When such operation reduces the likelihood of false wakeup of an access terminal, such operation facilitates communication activities in the communication network.

Figure 2:
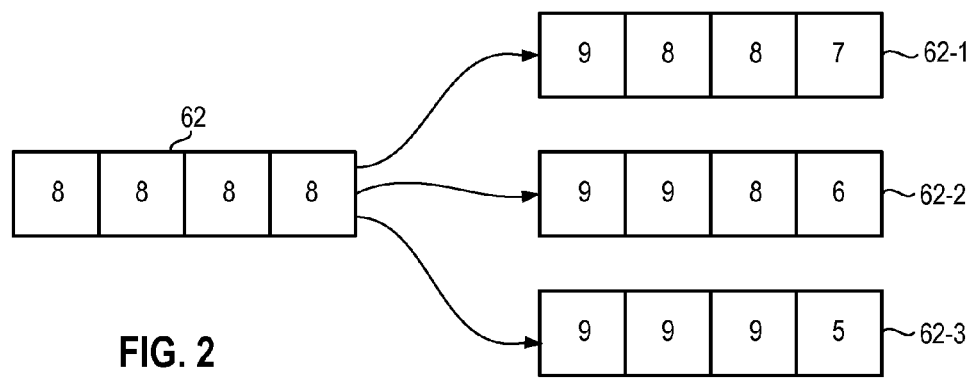
FIG. 2 illustrates a representation of exemplary structures that are formable pursuant to operation of an embodiment of the present invention.

FIG. 2 illustrates an exemplary representation of operation of rearrangement, such as that performed by the rearranger 35 shown in FIG. 1. Here, the structure, represented at 62 of a quick page message, such as that determined by the determiner 32 shown in FIG. 1, includes four partial identifiers, each of eight-bit lengths. Rearrangement performed by the rearranger creates any of various alternate structures of which structures 62-1, 62-2, and 62-3 are shown. The structure 62-1 is of bit lengths of nine-bit, eight-bit, eight-bit, and seven-bit lengths, respectively. The structure 62-2 includes partial identifiers of bit-lengths of nine bits, nine bits, eight bits, and six bits, respectively. And, the structure 62-3 is formed of partial identifiers of nine-bit, nine-bit, nine-bit, and five-bit lengths, respectively.

Figure 3:
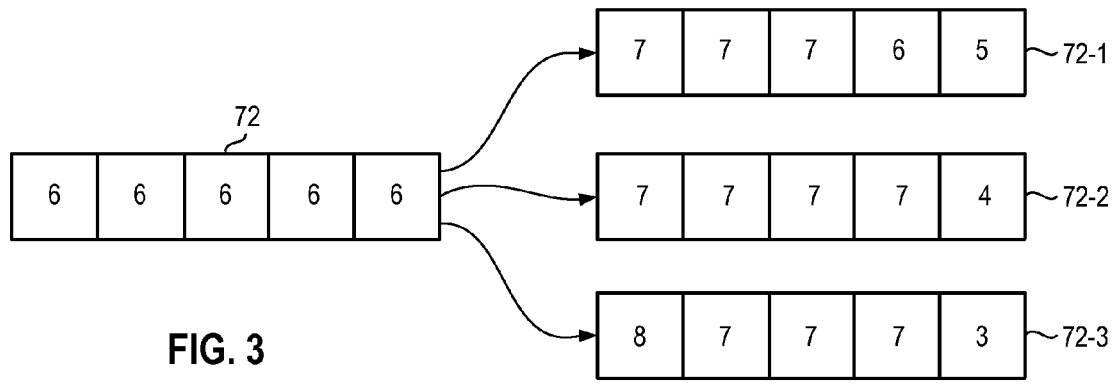
FIG. 3 illustrates a representation, similar to that shown in FIG. 2, but of a representation of other exemplary structures formable pursuant to additional operation of an embodiment of the present invention.

FIG. 3 illustrates other exemplary structures formable pursuant to operation of an embodiment of the present invention. Here, a structure initially formed includes partial identifiers of five access terminals. Initially, each of the partial identifiers is of a six-bit length. Rearrangement operations form any of various alternate structures, of which three alternate structures, designated as 72-1, 72-2, and 72-3 are shown in the figure. The structure 72-1 includes partial identifiers of seven-bit, seven-bit, seven-bit, six-bit, and five-bit lengths, respectively. The structure 72-2 is formed of partial identifiers of seven-bit, seven-bit, seven-bit, seven-bit, and four-bit lengths, respectively. And, the structure 72-3 is formed of partial identifiers of eight-bit, seven-bit, seven-bit, seven-bit, and three-bit lengths, respectively.

Referring back to FIG. 1 again, transceiver elements of the base transceiver station 16 cause broadcast of quick page messages that have been formatted by the quick page message formatter. The messages are broadcast upon a radio air interface, represented in FIG. 1 by the arrow 60. The messages are delivered to access terminals, such as the access terminal 12, within reception range of the broadcast messages. The access terminal 12 includes transceiver circuitry, here represented by a receive part 64 and a transmit part 66. The receive part 64 operates to receive signals sent thereto, such as the quick page messages broadcast by the access network. And, certain of the detected signals are provided to the apparatus 26 embodied at the access terminal. Of significance here are detections of the quick page message broadcast by the access network.

The apparatus 26 includes a number-of-pages detector 73 and a page identifier set value detector 74. The elements are functionally represented, also implementable in any desired manner, including algorithms executable by processing circuitry. The detector 73 detects an indication in the quick page message of the number of pages that are included in the received quick page message. The number of pages are indicated in, e.g., and as noted above, a three-bit segment of the quick page message. Detection of such indication is used by the page identifier set value detector in the detection of the page identifier sets, thereby to determine whether the access terminal is paged. Additional operation at the access terminal determines, in response to the number of pages detected by the page detector of the page value lengths of the page identifier set or sets contained in the quick page message. In the event that the detector detects the access terminal not to be paged, an indication is provided to an access terminal (AT) state controller 84 to cause the access terminal to be placed in a reduced-power state, e.g., a sleep mode. If a page is detected, conversely, an indication is provided to the state controller and the controller causes the state of the access terminal to permit its further operation with respect to paging and further communication.

The false wakeup probability at an access terminal is governed by the equation:

$$1 - [1 - \text{``}½\text{''}^n]$$

Wherein:

n identifies the number, i.e., bit length, of partial identifiers.

Through operation of an embodiment of the present invention, new structures are provided that, when used, reduce the likelihood of occurrence of false wakeup. FIGS. 2 and 3 illustrate various of the new structures when four and five identifiers are to be paged within a quick page message. During operation of an embodiment of the present invention, the number of bits for one of the partial identifiers is lowered in order to give a higher probability of a match of, viz., redundancy with, another partial identifier. In an example of five pages within a quick page message, there is a fifty-one percent possibility of occurrence of at least two five-bit partial identifiers being a match. Analogously, there is a twenty-eight percent probability of match of six-bit partial identifiers, a fifteen percent probability of redundancy of at least two seven-bit partial identifiers, and an eight percent probability of redundancy of at least two eight-bit partial identifiers. Structures are used if the likelihood of false wakeup for the structure is less than the likelihood of false wakeup when a hashing to individual page indication locations and use of single-bit identifiers are used.

The false wakeup probability for the structure 62-1 shown in FIG. 2 is governed by the following equation:

$$1 - \left(1 - \frac{1}{2^9}\right)\left(1 - \frac{1}{2^8}\right)^2\left(1 - \frac{1}{2^7}\right)$$

The false wakeup probability for the structure 62-2 shown in FIG. 2 is:

$$1 - \left(1 - \frac{1}{2^9}\right)^2\left(1 - \frac{1}{2^8}\right)\left(1 - \frac{1}{2^6}\right)$$

The false wakeup probability for the structure 62-3 shown in FIG. 2 is:

$$1 - \left(1 - \frac{1}{2^9}\right)^3\left(1 - \frac{1}{2^5}\right)$$

The structure that exhibits the lowest false wakeup probability and that generates a partial identifier that can be eliminated, if any, is the structure used by the access network. The overall false wakeup probability for a number of pages is determinable by summing the products of the various false wakeup probabilities for the new structure and the percentage of page combinations that would use them together with the product of the false wakeup probability of a page indication method for the number of pages and the percentage of page combinations where matches are unable to be made.

The disclosure aims to improve battery life by introducing a method for partial identity comparison with random or pseudorandom bits in page messages.

Addresses are transmitted starting with the least significant bit and continuing with more significant bits. If the address is long, it could potentially get to a less random part of the address and the technique would be less effective. Contribution C20-20060731-033 suggests that partial hashes be used in partial comparison method. The hashes would be hashes of an address. The address that the hash is based on may not be completely random, so this may still not produce the best partial identities for partial identity comparison. If a hash is not completely random, it could result in an increase in the false wakeup probability. Furthermore, the hashing is an extra step that it would be nice to avoid. The invention solves the problem by performing partial identity comparison using a random or pseudorandom variable (such as SessionSeed) that is known to both the AN (access network) and the AT (access terminal). Most significant bits of the SessionSeed could be used as partial identities in page messages, for example.

Presently preferred embodiments of the invention and many of its improvements and advantages have been described with a degree of particularity. The description is of preferred examples of implementing the invention, and the description of preferred examples is not necessarily intended to limit the scope of the invention. The scope of the invention is defined by the following claims.

What is claimed:

1. Apparatus comprising:
   a transmitter;
   a control circuit operably coupled to the transmitter and configured to, in response to having a need to alert a plurality of access terminals with respect to corresponding pending calls by use of a quick page message having a first predetermined number of bits for partial identities for access terminals:
      provide a partial identity for each of the plurality of access terminals, wherein each of the partial identities has a same bit length;
      shorten a bit length for at least one of the partial identities to thereby increase a likelihood of there being identical partial identities amongst the partial identities for the plurality of access terminals;
      lengthen a bit length for at least one of the partial identities to thereby increase total bit count for all of the partial identities to a second number of bits that is different than the first predetermined number of bits and to thereby reduce a likelihood of false wake ups for any receiving access terminals not having a pending call;
      form the quick page message using at least one partial identity having a shortened bit lengthened and at least one partial identity having a length and bit length and transmitting the quick page message via the transmitter.

2. The apparatus of claim 1 wherein the quick page message comprises a Quick Paging Channel, QPCH, message.

3. A method for facilitating access-terminal paging with respect to corresponding pending calls by use of a quick page message having a first predetermined number of bits for partial identities for access terminals, said method comprising:
   by a control circuit:
      providing a partial identity for each of a plurality of access terminals, wherein each of the partial identities has a same bit length;
      shortening a bit length for at least one of the partial identities to thereby increase a likelihood of there being identical partial identities amongst the partial identities for the plurality of access terminals;
      lengthening a bit length for at least one of the partial identities to thereby increase total bit count for all of the partial identities to a second number of bits that is different than the first predetermined number of bits and to thereby reduce a likelihood of false wake ups for any receiving access terminals not having a pending call;
      forming the quick page message using at least one partial identity having a shortened bit length and at least one partial identity having a lengthened bit length and transmitting the quick page message via the transmitter.

* * * * *